July 14, 1953 A. A. STOFLETH 2,645,051
FISHING TACKLE WITH RETRIEVING MEANS COMBINED THEREWITH
Filed April 4, 1952
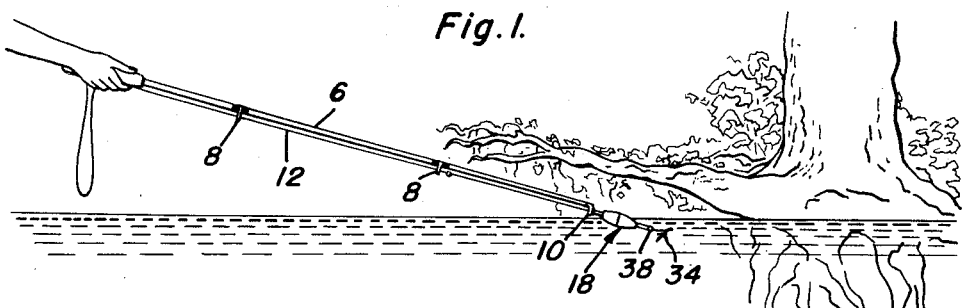
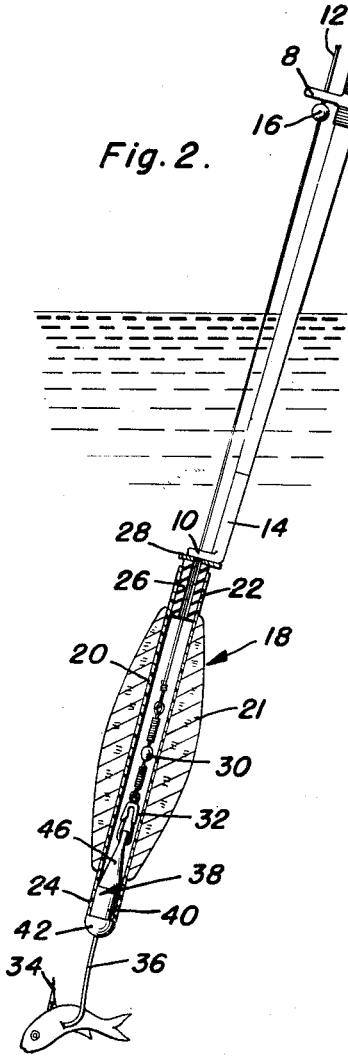
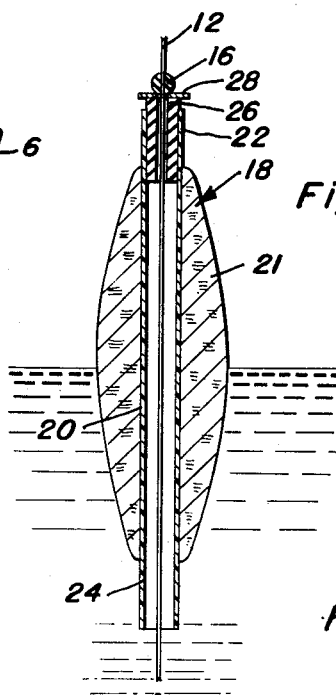
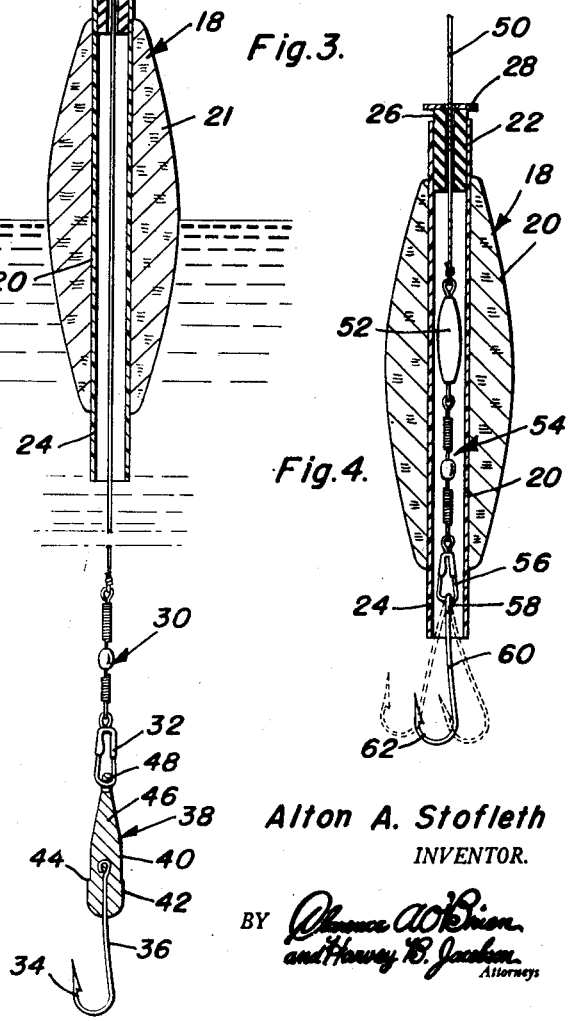
Alton A. Stofleth
INVENTOR.

Patented July 14, 1953

2,645,051

UNITED STATES PATENT OFFICE 2,645,051

FISHING TACKLE WITH RETRIEVING MEANS COMBINED THEREWITH

Alton A. Stofleth, Evansville, Ind.

Application April 4, 1952, Serial No. 280,552

4 Claims. (Cl. 43—17.2)

The present invention relates to certain new and useful improvements in fishing tackle characterized by a relatively long pole having a fishing line associable therewith and of the type used in so-called sliding bobber fishing where live bait is used on the hook and where the fishing operations are carried on adjacent to a bank or shore line where overhanging limbs, brush, growing weeds and surface snags are encountered and which render desired fishing spots substantially inaccessible to the fisherman using conventional-type fishing tackle.

One object of the invention is to provide unique but highly practical fishing tackle which is expressly adapted for successful fishing accomplishments despite the area guarding obstacles met in that the tackle employed is such that it provides manually regulable and controllable means whereby the fisherman may aptly place a live baited hook in a given or desired spot by carefully and skilfully piloting the same through selected passages between entanglements, a task not usually undertaken when provided with conventional types of fishing tackle.

Another object of the invention is to be able to employ the same novel piloting and placement means to successfully disengage and retrieve a snagged hook without the loss of or injury to the live bait or damage to the fishing tackle.

A further object of the invention is to provide fishing tackle which is such in construction as to enable the user to replace a baited hook with the hook automatically setting at the original depth before the deterring snag was encountered.

More specifically, the invention has to do with fishing tackle characterized by a fishing pole having line guide eyes mounted thereon, one of said eyes being affixed to the tip end of said rod, a fishing line passing slidably through said eyes, a fishhook carried by the free end of said line, sinker means on said line, a bobber slidable on said line inwardly of said sinker means, a depth control stop slidably and detachably mounted on said line and engageable with one end of said bobber, said stop being of a size smaller than said guide eyes and therefore freely passable through said eyes.

Another aspect of the invention has to do with tackle constructed as stated wherein said bobber embodies an axial bore, a tubular stem fitted in said bore, and a reducing bushing telescopically fitted into one end of said stem, the bore in said bushing being of a diameter less than the diameter of the manually regulable stop.

More importantly, the invention appertains to fishing tackle comprising an assemblage including a pole, a fishing line cooperable with said pole, a live bait fishing hook attached to the free trapping end of said line, and means on said line between said hook and stop whereby the portion of the line between said hook and pole may be rendered temporarily rigid to facilitate piloting the baited hook through brush and the like and locating the hook at a desired fishing spot and, alternatively, permitting the hook to be retrieved from snags without destroying a live bait carried by said hook.

Then, too, novelty is predicated on fishing tackle embodying a depth regulating adjustable check stop, a bobber having a tubular axially extending stem, and a bushing plugged into the upper end of the stem, said bushing having a reduced bore smaller than said check stop, and a live bait fishhook having a sinker integrated with the shank of the hook, the intermediate portion of said sinker being cylindrical and of a diameter to telescope into said stem, the upper end of the sinker being conical and the lower end having an enlarged head providing a stop shoulder which is engageable with the lower end of said stem.

Briefly summarized, the essence of the invention, as will be hereinafter clear, has to do with fishing tackle which, in an over-all sense, is characterized by a combined fishing pole, conventional fishing line, bobber or float, sinker, and fishhook assembly. To this end, the pole has aligned guide eyes on one side thereof, with one of said eyes affixed to the pole at the tip of the pole and provided with an exterior surface substantially at right angles to the longitudinal axis of the pole and also in a single plane. The bobber has a central cylindrical axial passage or opening provided with a bushing. The bushing is at the upper end of the opening and the extending upper end of the bushing itself is provided with an end thrust abutment having a surface also in a single plane to align with and abut the corresponding exterior surface of the stated eye. The sinker has the shank of the hook embedded therein and integral therewith, a portion of the sinker being cylindrical and of a diameter to fit snugly but slidably within the lower end of the opening in the bobber, said sinker having, at the end thereof from which the hook extends, a flange provided with a flat surface. Obviously, the flat surface is adapted to firmly abut the lower end of the bobber. There is a suitable stop adjustably secured to the line and said stop is of a diameter to pass freely through the eye at the tip end of the pole, the bore of said bushing being, of course, of a diameter less than the diameter of the stop to prevent the stop from passing through said bore. The line has a swivel at the lower end which is adapted to pass freely through the lower end of the stated opening and the swivel is secured to the sinker so that by pulling the line tautly through said opening and bushing, this will cause the hook, sinker, bobber and pole to come together into rigid relationship to facilitate removal of the hook from an obstacle, other than a fish, with which said hook may be engaged.

Other objects, features and advantages will become more readily apparent from the following description and the accompanying sheet of illustrative drawings.

In the accompanying sheet of drawings wherein like numerals are employed to designate like parts throughout the views:

Figure 1 is an elevational view showing fishing tackle constructed in accordance with the principles of the present invention and showing the manner in which the same is used for exactly positioning a live baited hook at a desired fishing spot and for, alternatively, disengaging and retrieving the hook if snagged.

Figure 2 is a view of a fragmentary type which is partly in section and partly in elevation and which shows the manner in which the hook is temporarily close-coupled to the bobber and with the pole in alignment with the bobber and abutting the same, this being the relationship of parts for disengaging and retrieving the snagged hook, or alternatively, placing the hook at a desired fishing spot.

Figure 3 is a view with parts in section and elevation showing the normal fishing relationship of the parts and freedom of action of the line under these conditions.

Figure 4 is a view in section and elevation based on Figure 2 and disclosing a modification in the arrangement and construction of the parts.

Referring now to the drawings by way of reference numerals and accompanying lead lines, the fishing pole is denoted by the numeral 6 and generally ranges some eight to ten feet in length. This may be a bamboo or equivalent pole. It is provided at suitably spaced points with attached eyes 8 and 10 to attach and guide the fishing line 12. The outermost eye is carried by the usual tip or ferrule 14. As before mentioned the line is provided with a slidable and detachable check-stop 16 which may be of rubber, balsa wood or any material which will friction cling to the line in order that a predetermined depth may be obtained. The stop is preferably spherical and of a diameter to allow it to pass freely through the guide eyes 8 and 10 without hindrance.

The bobber 18 embodies a cork or equivalent float 21 which is axially bored, the bore having a tubular stem 20 anchored therein with its end portions 22 and 24 projecting beyond the upper and lower ends of the float. A reducing bushing 26 is provided and this is fitted telescopically into the upper end portion 22 and the bushing in turn is provided with a restricted line bore and an end thrust washer or abutment 28 which serves as a satisfactory shoulder for the guide eye 10 in the consolidated arrangement of pole, bobber, sinker and hook assembly shown in Figure 2 and also serves as a shoulder for the check-stop in the fishing arrangement shown in Figure 3. In Figures 2 and 3 it will be seen that the line is provided at its fishing or trapping end with a swivel 30 carrying a clasp 32. The fishing hook 34 embodies a shank 36 embedded in a complemental sinker 38. The sinker has a cylindrical body portion 40, an enlarged head or flange 42 providing a shoulder 44, a conical piloting upper end 46 and an eye 48 which is detachably connected with the clasp 32. With this arrangement it is obvious that the sinker is so molded as to permit the extended portion of the stem of the bobber to encase a major portion of the sinker, the shoulder 44 providing a check for the bobber stem and stopping the downward movement of the bobber and preventing the crushing of the live bait on the hook.

With the arrangement depicted in Figures 2 and 3 it is obvious that the sinker 38 may be telescoped into the lower end portion of the tubular stem 24 in the manner best shown in Figure 2 when the fishing hook becomes close-coupled with the bobber and the two form a ways and means whereby the coacting otherwise flexible portion of the line is rendered temporarily rigid. At the same time the eye 10 is engaged with the washer 28 whereby the rod, bobber and hook constitute a continuation of components which make it possible to accomplish the aforementioned objective. That is to say, with this arrangement (Figure 2) means is provided for placing a baited hook in a given or desired spot against obstacles of overhanging limbs, surface snags and so on, which, ordinarily, render inaccessible the fishing spot if conventional type fishing tackle is employed. Moreover, the same means serves to provide for disengaging and retrieving a snagged hook without the loss or injury to live bait or damage to the tackle. Then, too, and by reason of the adjustable stop means 16, one is permitted to replace the baited hook with the hook automatically setting at the original depth as before the snag occurred. The latter accomplishment will be clear upon examining the relative positions of parts as revealed in Figure 3.

In the modification shown in Figure 4 the bobber is of the construction already described as is the pole and stop means. For this reason, the bobber is referred to by the numerals already employed in Figures 2 and 3. For convenience, however, the line is here denoted by the numeral 50 and the sinker 52 is attached to the end of the line and is provided with a swivel 54 having a clasp 56 to which the eye 58 on the shank 60 of the hook 62 is connected. Here the sinker instead of being integral with the fishing hook is separate and spaced from the hook. It has been found however that it is possible with this set up to encase the sinker 52, line 50, swivel 54, clasp 56 and an end portion of the shank 60 in the open ended stem 20 and when the shank of the hook is canted to either of the dotted line positions shown it is close coupled, as it were, with the stem, making it possible to accomplish the same results attainable with the arrangement set forth in Figure 2 but with, of course, less control and efficiency. For greater ease, speed and reliability, the constructional arrangement depicted in Figure 2 is, of course, preferred by fishermen.

Minor changes in shape, size, materials and rearrangement of parts may be resorted to in actual practice provided no departure is made from the invention as claimed.

Having described the invention, what is claimed as new is:

1. Fishing tackle comprising a combined fishing pole, line, bobber, sinker, and fishhook assembly wherein said pole has aligned line eyes on one side thereof, one of said eyes being fixed to the pole at the tip of said pole and provided with an exterior surface substantially at right angles to the longitudinal axis of the pole and in a single plane, said bobber having a central cylindrical axial opening provided with a bushing, said bushing being provided at its upper end with an end thrust abutment having a surface in a single plane and adapted to align with and abut the complemental exterior surface of said eye, said sinker having said hook integral therewith, a portion of said sinker being cylindrical and of a diameter to fit snugly but slidably within the lower end of the opening in said bobber, said sinker having, at the end thereof from which the hook extends, a flange provided with a flat surface, said flat surface adapted to firmly abut the lower end of said bobber, and a stop adjustably secured to said line, said stop being of a diameter to pass freely through the eye at the tip end of said pole, the bore of said bushing being of a diameter less than the diameter of said stop, said line having a swivel at the lower end of the line adapted to pass freely through the lower end of said opening, said swivel being secured to said sinker, whereby pulling of the line tautly through said opening and bushing will cause the hook, sinker, bobber and pole to be in rigid relationship to facilitate removal of the hook from an obstacle, other than a fish, with which said hook may be engaged.

2. A fishing tackle assembly for pole and line fishing comprising, in combination, a fishing line, a sinker, a fishhook having a shank embedded in said sinker, said sinker having a body portion of prescribed cross-section and also having an outstanding peripheral flange at the end of the body portion from which the hook extends, said flange having a surface providing a stop shoulder, a swivel connecting one end of said line to said sinker, a bobber having a passage extending axially therethrough, the lower end of said passage conforming in shape and cross-section to said body portion and said body portion telescoping and fitting snugly but slidably into said lower end of said passage and said stop shoulder firmly abutting the lower end of said bobber, a reducer bushing removably fitted into the upper end of said passage, said line passing upwardly through and beyond the bore of said bushing, the upper end of said bushing having a flat end thrust abutment in a single plane, a stop adjustably secured to said line above said abutment, said stop being of a diameter greater than the diameter of the bore of said bushing, and a rigid fishing pole having aligned line eyes attached to and projecting from one side of the pole, one of said eyes being affixed to the pole at the tip end of said pole and provided with a substantially flat surface in a single plane substantially parallel with said abutment and adapted to bear firmly against said abutment, said one eye being of a diameter greater than the diameter of said stop, whereby when said line is tautened and said one eye is brought to bear firmly against said abutment, the hook, sinker, bobber and pole simultaneously unite as a single substantially rigid assembly to facilitate piloting the hook toward a given fishing spot, or, alternatively, function to facilitate disengaging and retrieving the hook from an obstacle, other than a fish, with which said hook may be engaged.

3. A fishing tackle assembly for pole and line fishing comprising, in combination, a fishing line, a sinker, a fishhook having a shank embedded in said sinker, said sinker having a body portion of prescribed cross-section and also having an outstanding peripheral flange at the end of the body portion from which the hook extends, said flange having a surface providing a stop shoulder, a swivel connecting one end of said line to said sinker, a bobber having a passage extending axially therethrough, the lower end of said passage conforming in shape and cross-section to said body portion and said body portion telescoping and fitting snugly but slidably into said lower end of said passage and said stop shoulder firmly abutting the lower end of said bobber, a reducer bushing removably fitted into the upper end of said passage, said line passing upwardly through and beyond the bore of said bushing, the upper end of said bushing having a flat end thrust abutment in a single plane adapted to accommodate one end of a rigid fishing pole when said one end is brought to bear against said abutment, and a stop adjustably secured to said line above said abutment, said stop being of a diameter greater than the diameter of the bore of said bushing.

4. In a fishing device of the class described, a fishing line, bobber, sinker and fishhook assembly, said bobber having a central axial passage and a tubular open ended cylindrical stem secured in said passage, a reducer bushing fitted telescopically and removably in the normal upper end of said stem, the upper end of said bushing having a flat faced end thrust abutment in a single plane at right angles to the axis of said stem, said sinker having a cylindrical upper end portion of an outside diameter corresponding approximately with the inside diameter of said stem fitted firmly but releasably into said stem, said sinker having at the end thereof from which said hook extends, an outstanding peripheral flange having an upper flat surface firmly abutting the lower end of said stem whereby said hook is then firmly but releasably joined with said bobber, a swivel connected to the other end of said sinker and situated in the passage of said stem, a fishing line passing through the bore in said bushing and joined to said swivel, and a stop mounted adjustably on said line above said bushing, said stop being of a diameter greater than the diameter of the bore of said bushing.

ALTON A. STOFLETH.

References Cited in the file of this patent

UNITED STATES PATENTS

| Number | Name | Date |
|---|---|---|
| 148,926 | Cahoon | Mar. 24, 1874 |
| 786,597 | Picken | Apr. 4, 1905 |
| 1,193,912 | Maire et al. | Aug. 8, 1913 |
| 2,140,724 | Stefan | Dec. 20, 1938 |
| 2,498,815 | McVay | Feb. 28, 1950 |